June 12, 1962

H. C. MOORE 3,038,185

AUTOMATIC LEVELER FOR AIRCRAFT LOADING
AND UNLOADING STRUCTURE

Filed Jan. 12, 1959

INVENTOR
HERBERT CARVEL MOORE

BY HIS ATTORNEYS
HARRIS, KIECH, RUSSELL & KERN

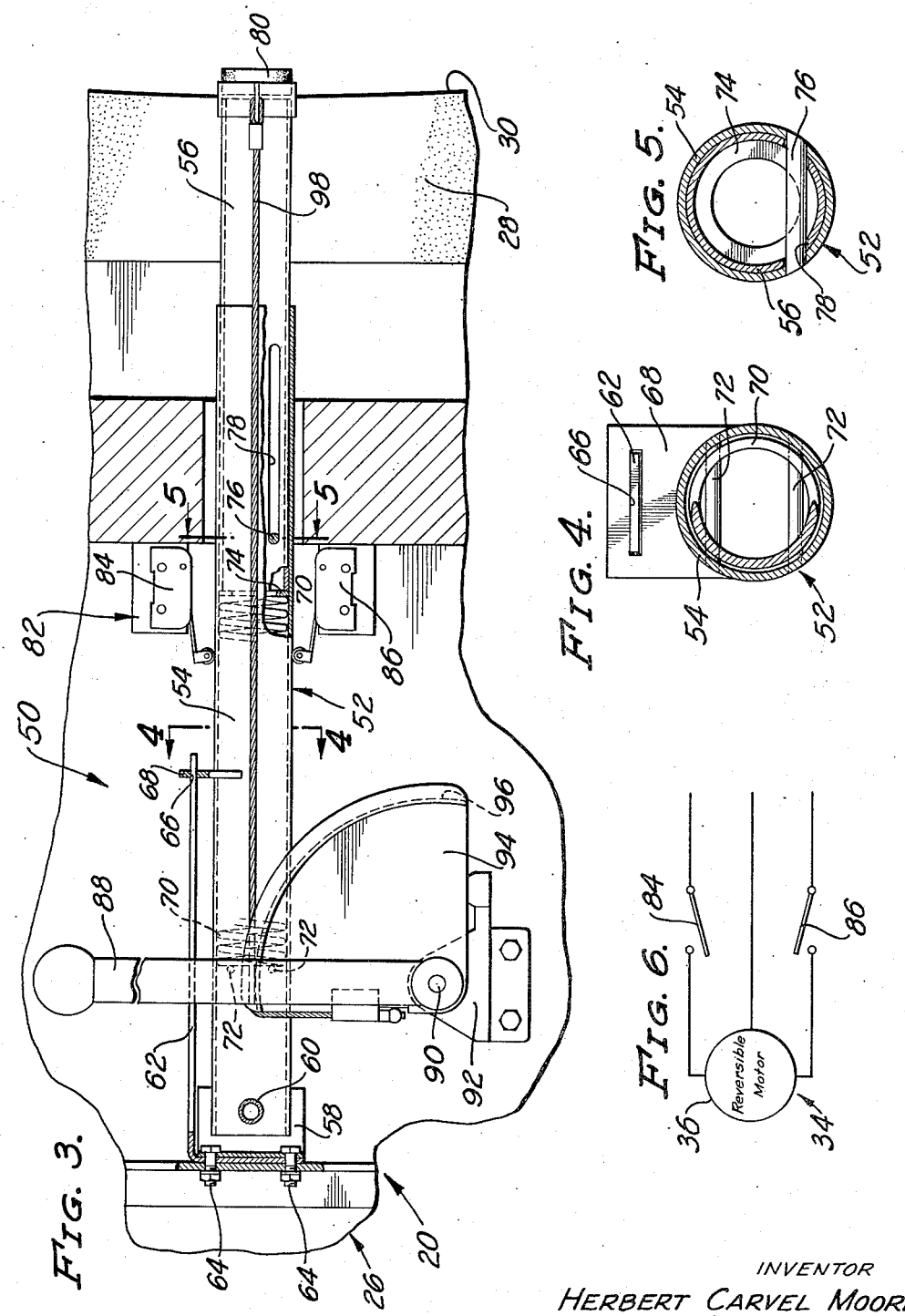

United States Patent Office 3,038,185
Patented June 12, 1962

3,038,185
AUTOMATIC LEVELER FOR AIRCRAFT LOADING AND UNLOADING STRUCTURE
Herbert Carvel Moore, West Los Angeles, Calif., assignor, by mesne assignments, to Stanray Corporation, Chicago, Ill., a corporation of Delaware
Filed Jan. 12, 1959, Ser. No. 786,298
6 Claims. (Cl. 14—71)

The present invention relates in general to a vehicular loading and unloading structure and, more particularly, to a structure intended primarily for use with aircraft, or other vehicles, to load and unload passengers, although it may be utilized for other purposes.

Basically, the invention contemplates a passenger loading and unloading structure which includes a passageway adapted to bridge the space between a doorway of an aircraft and a point of embarkation and debarkation, such as a doorway of an airport terminal building adjacent which the aircraft is parked. The passageway is provided with a vehicle engaging end adapted to be moved into engagement with the aircraft adjacent the doorway therein so that passengers may step directly from the passageway into the aircraft, and vice versa.

As will be apparent, the exact location of a particular aircraft doorway will vary considerably in both horizontal and vertical directions, depending upon where the aircraft is parked, the type of aircraft, the load carried by the aircraft, and the like. Consequently, the loading and unloading structure is provided with means for moving the vehicle engaging end of the passageway horizontally toward and away from the aircraft, horizontally along the aircraft, and vertically relative thereto. By appropriate operation of these various means, the vehicle engaging end of the passageway may be brought into precise register with the aircraft doorway.

It frequently happens that the elevation of the aircraft doorway above ground level changes after the vehicle engaging end of the passageway has been brought into engagement with the aircraft, this being due to changes in the loading of the aircraft. For example, as passengers enter or leave the aircraft via the passageway, the position of the doorway may shaft vertically, the same thing happening as baggage is loaded or unloaded, as fuel is loaded, and the like. The resulting relative movement of the aircraft and the vehicle-engaging end of the passageway may result in damage to the aircraft, which is obviously undesirable.

In view of the foregoing, a primary object of the invention is to provide means for causing the vehicle engaging end of the passageway to follow the doorway in the aircraft as the doorway moves upwardly or downwardly in response to changes in the aircraft loading.

More particularly, an important object of the invention is to provide reversible motor means connected to the passageway for raising and lowering the vehicle engaging end thereof, and to provide control means carried by the passageway and engageable with the fuselage of the aircraft adjacent the doorway for operating the reversible motor means in directions to raise and lower the vehicle engaging end of the passageway in response to upward and downward movement of the aircraft fuselage adjacent the doorway. Thus, the vehicle engaging end of the passageway follows the aircraft doorway as it moves upwardly or downwardly, which is an important feature.

Another object is to provide a control means which includes a vertical movement detector movably mounted on the passageway and engageable with the aircraft, and which includes actuating means for the reversible motor means engageable by the detector, the actuating means being operated by the detector in such a manner as to energize the reversible motor means in directions to cause the vehicle engaging end of the passageway to follow the doorway in the aircraft.

The foregoing objects, advantages, features and results of the present invention, together with various other objects, advantages, features and results thereof which will be evident to those skilled in the art to which the invention relates, may be achieved with the exemplary embodiment of the invention described in detail hereinafter and illustrated in the accompanying drawings, in which:

FIG. 3 is an enlarged, fragmentary view, partially in elevation and partially in section, illustrating a control means of the invention;

FIGS. 4 and 5 are sectional views taken along the arrowed lines 4—4 and 5—5, respectively, of FIG. 3; and FIG. 6 is a highly simplified diagram of an electric circuit which may be incorporated in the invention.

Figure 1:
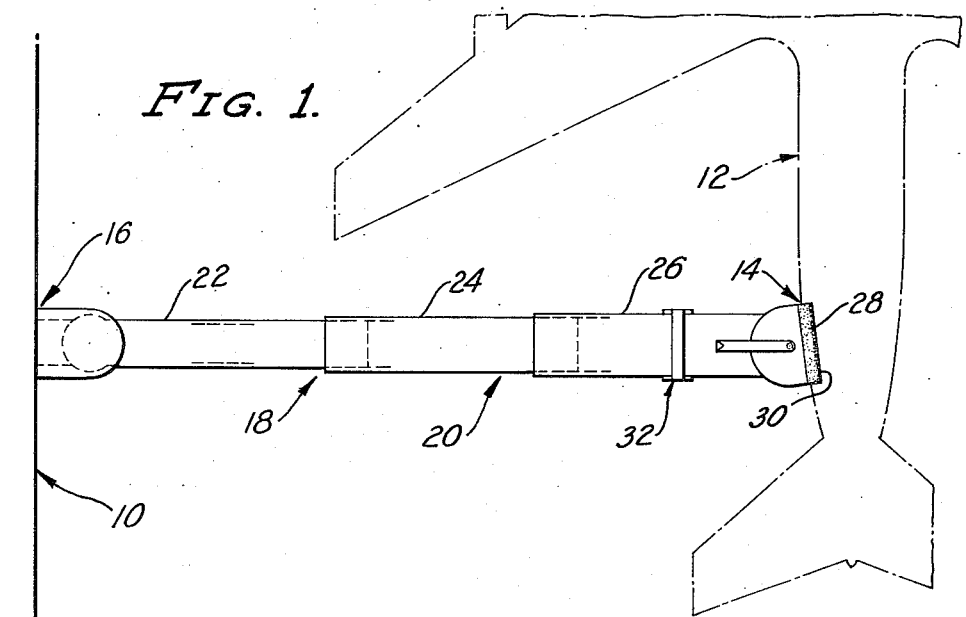
FIG. 1 is a semidiagrammatic plan view illustrating an aircraft loading and unloading structure which embodies the invention.
Figure 2:
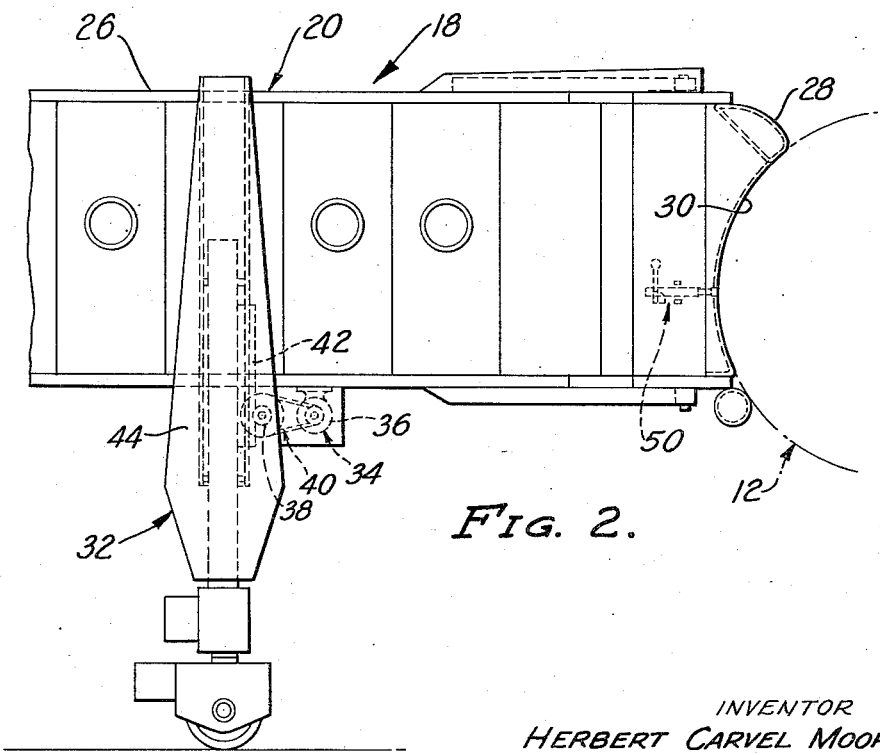
FIG. 2 is an enlarged, fragmentary elevational view of a portion of the structure.

Referring to FIG. 1 of the drawings, the numeral 10 designates an airport terminal building adjacent which is parked an aircraft 12 to be loaded or unloaded. The aircraft 12 is provided with a doorway, not shown, at the point 14 and the building 10 is provided with a corresponding doorway, not shown, at the point 16, the doorway in the building preferably being at the second floor level so that it is at more or less the same elevation as the doorway in the aircraft.

The space between the doorways at the points 14 and 16 is adapted to be bridged by a telescoping loading and unloading structure 18. The telescoping structure 18 is pivotally anchored relative to the building 10 at its inner end for movement about horizontal and vertical axes, and is extensible and contractible, so that its outer end, sometimes referred to herein as its vehicle engaging end, or as its vertically movable end, may be brought into precise register with the corresponding doorway in the aircraft 12. The fact that the doorway in the building 10 is at the second floor level makes the telescoping structure 18 at least approximately horizontal since the doorway in the aircraft 12 is at about the same level, thereby facilitating movement of passengers to and from the aircraft and leaving the ground level clear for the handling of baggage, and the like. When not in use, the telescoping structure 18 may be swung into a position parallel to the building 10.

The telescoping structure 18 includes a telescoping passageway 20 having telescopically connected inner, intermediate and outer sections 22, 24 and 26, the outer section 26 terminating at its outer end in an aircraft engaging bumper 28 which forms an aircraft engaging end 30 of the passageway 20. Preferably, the telescoping passageway 20 is a completely enclosed passageway, which effect is achieved by making the sections 22, 24 and 26 tubular. However, the present invention is not limited to a completely enclosed passageway and may be utilized in conjunction with one which is simply a ramp or gangplank.

The outer section 26 of the passageway 20 is carried by a mobile supporting structure 32 by means of which the passageway 20 may be extended and contracted to move the aircraft engaging end 30 thereof toward and away from the aircraft 12, and by means of which the aircraft engaging end 30 may be swung horizontally in a direction more or less parallel to the longitudinal axis of the fuselage of the aircraft. This is achieved by making the mobile supporting structure 32 a self-propelled, steerable, wheeled structure.

In order to move the aircraft engaging end 30 of the passageway 20 vertically to bring it to the elevation of the doorway in the aircraft 12, a reversible motor means 34 for raising and lowering the aircraft engaging end 30 is provided. The reversible motor means 34 may be of any suitable type, such as electric, pneumatic, hydraulic, or the like, a reversible electric motor 36 being shown for convenience.

The reversible motor 36 is shown as mounted on the outer section 26 of the passageway 20 and as driving a pinion 38 through suitable speed reducing means 40. The pinion 38 is meshed with a rack 42 carried by a frame 44 of the mobile supporting structure 32, this rack being oriented vertically. Consequently, as the motor 36 rotates in one direction or the other, it raises or lowers the aircraft engaging end 30 of the passageway 20 as required to move it to precisely the level of the doorway in the aircraft 12.

The invention provides a control means, designated generally by the numeral 50, for operating the reversible motor 36 in directions to raise and lower the aircraft engaging end 30 of the passageway 20 in response to upward and downward movement of the portion of the fuselage of the aircraft 12 which is engaged by such end of the passageway, the control means being carried by the passageway adjacent the end 30 thereof and being engageable with the fuselage of the aircraft adjacent the doorway therein.

Considering the control means 50 in more detail, and referring particularly to FIGS. 3, 4 and 5 of the drawings, it includes a vertical movement detector or detector member 52 which is movably mounted on the outer section 26 of the passageway 20 adjacent the aircraft engaging end 30 thereof and which is engageable with the fuselage of the aircraft 12 adjacent the doorway. The detector 52 is a telescoping member and comprises telescopically connected, tubular base and aircraft engaging elements 54 and 56. The passageway section 26 carries a bracket 58 to which the base element 54 is pivotally connected for movement in a vertical plane by a pin 60. The base element 54 is spring biased to a centered or neutral position by a cantilevered leaf spring 62 which is attached to the passageway section 26 at one end and to the base element 54 at its other end. In the construction illustrated, the leaf spring 52 is attached to the passageway 26 by bolts 64 which also serve to attach the bracket 58. The free end of the leaf spring 62 is slidable in an aperture 66 in a lug 68 attached to the base element 54. As will be apparent, the leaf spring 62 constantly biases the detector 52 toward a neutral position from which the detector may be moved upwardly or downwardly.

The aircraft engaging element 56 is slidable in the base element 54 axially of the passageway 20 and is spring biased outwardly toward the aircraft 12 by a compression spring 70 disposed within the base element 54, the spring 70 being seated against stop pins 72 carried by the base element 54 at its inner end and being seated at its outer end against an annular flange 74 on or engaging the inner end of the element 56. A pin 76 carried by the base element 54 and disposed in a slot 78 in the aircraft engaging element 56 limits movement of the element 56 relative to the element 54. The pin 76 and the slot 78 are so located that when the aircraft engaging element 76 is in its outermost or extended position, an aircraft engaging bumper or pad 80 thereon projects axially of the passageway 20 beyond the aircraft engaging end 30 thereof, i.e., beyond the bumper 28. Thus, when the bumper 28 is in engagement with the fuselage of the aircraft 12 adjacent the doorway at the point 14, the pad 80 is also in engagement with the fuselage of the aircraft and is held firmly thereagainst by the spring 70.

As will be apparent, when the pad 80 is pressed firmly against the fuselage of the aircraft 12 by the spring 70 in the foregoing manner, any upward or downward movement of the fuselage relative to the bumper 28 causes corresponding upward or downward movement of the detector 52 relative to the passageway section 26. This upward or downward movement of the detector 52 relative to the passageway section 26 is utilized to actuate switch means 82 for operating the reversible motor 36 in directions to raise and lower the aircraft engaging end 30 of the passageway 20 correspondingly so that the end 30 of the passageway follows the doorway in the aircraft as the fuselage adjacent the doorway moves upwardly or downwardly. In the particular construction illustrated, the switch means 82 is shown as including microswitches 84 and 86 mounted on the passageway section 26 above and below and engageable by the base element 54 of the detector 52. As shown in highly simplified form in FIG. 6, the microswitches 84 and 86 are so connected to the reversible motor 30 as to cause it to rotate in opposite directions, closure of the upper microswitch 84 causing the reversible motor 36 to rotate in a direction to raise the aircraft engaging end 30 of the passageway 20, and closure of the microswitch 86 having the opposite effect.

The aircraft engaging element 56 of the detector 52 is adapted to be retracted manually by a handle 88 which is pivotally connected, at 90, to a bracket 92 suitably mounted on the passageway section 26. The handle 88 has connected thereto a quadrant 94 having therein a groove 96 for a cable 98 connected at one end to the handle-quadrant assembly and connected at its other end to the aircraft engaging element 56 adjacent the outer end thereof. As will be apparent, by rotating the handle 88 in the counterclockwise direction, as viewed in FIG. 3, the aircraft engaging element 56 is moved into a retracted position wherein the pad 80 is located inwardly of the aircraft engaging end 30 of the passageway 20.

Considering the operation of the invention, with the detector 52 contracted by means of the handle 88 so that the aircraft engaging element 56 is in its retracted position, the aircraft engaging end 30 of the passageway 20 is brought into engagement with the aircraft 12 to register such end of the passageway with the doorway at the point 14. The handle 88 is then released to permit the spring 70 to press the pad 80 firmly against the fuselage of the aircraft 12 adjacent the doorway. If the doorway then rises or falls as the loading of the aircraft 12 changes, the detector 52 is pivoted upwardly or downwardly relative to the passageway section 26 to actuate the microswitch 84, or the microswitch 86, these microswitches operating the reversible motor 36 in directions to cause the aircraft engaging end 30 of the passageway to follow the doorway in the aircraft. Specifically, if the doorway in the aircraft 12 moves upwardly due to a load shift, the detector 52 is pivoted upwardly relative to the outer passageway section 26 to close the microswitch 84, thereby energizing the reversible motor 36 in a direction to elevate the aircraft engaging end 30 of the passageway correspondingly. The reverse action occurs when the doorway in the aircraft 12 descends due to a load shift. Thus, the aircraft engaging end 30 of the passageway 20 constantly follows the doorway in the aircraft as it moves upwardly or downwardly. It will be understood that the relative movement between the detector 52 and the passageway section 26 necessary to actuate the microswitches 84 and 86 is quite small so that there is actually no relative movement between the bumper 28 and the fuselage of the aircraft, the inherent flexibility of the bumper 28 absorbing the relative movement necessary to produce actuation of the microswitches. Thus, for all practical purposes, the aircraft engaging end 30 of the passageway 20 follows the fuselage of the aircraft without any relative movement therebetween.

Although an exemplary embodiment of the invention has been disclosed herein for purposes of illustration, it will be understood that numerous changes, modifications and substitutions may be incorporated in such embodiment without departing from the spirit of the invention as defined by the claims which follow.

I claim:
1. In a vehicular loading and unloading structure, the combination of: a passageway having a vertically movable, vehicle engaging end; reversible motor means connected to said passageway for raising and lowering said vertically movable end thereof; and control means carried by said passageway adjacent said vertically movable end thereof for operating said reversible motor means in directions to raise and lower said vertically movable end of said passageway in response to upward and downward movement of the portion of a vehicle engaged by said vertically movable end of passageway, said control means including a vertical movement detector abuttable directly against and frictionally engageable with the vehicle; and actuating means for said reversible motor means engageable by said detector.

2. In a vehicular loading and unloading structure, the combination of: a passageway having a vertically movable, vehicle engaging end; reversible motor means connected to said passageway for raising and lowering said vertically movable end thereof; and control means carried by said passageway adjacent said vertically movable end thereof for operating said reversible motor means in directions to raise and lower said vertically movable end of said passageway in response to upward and downward movement of the portion of a vehicle engaged by said vertically movable end of said passageway, said control means including a vertical movement detector abuttable directly against and frictionally engageable with the vehicle and mounted on said passageway for vertical movement relative thereto, said control means also including actuating means for said reversible motor means engageable by said detector.

3. In a vehicular loading and unloading structure, the combination of: a passageway having a vertically movable, vehicle engaging end; reversible motor means connected to said passageway for raising and lowering said vertically movable end thereof; and control means carried by said passageway adjacent said vertically movable end thereof for operating said reversible motor means in directions to raise and lower said vertically movable end of said passageway in response to upward and downward movement of the portion of a vehicle engaged by said vertically movable end of said passageway, said control means including a vertical movement detector frictionally engageable with the vehicle and mounted on said passageway for vertical movement relative thereto, said control means also including actuating means for said reversible motor means engageable by said detector, said detector including a vehicle engaging element frictionally engageable with the vehicle and resilient means for biasing said vehicle engaging element into frictional engagement with the vehicle.

4. In a vehicular loading and unloading structure, the combination of: a passageway having a vertically movable, vehicle engaging end; reversible motor means connected to said passageway for raising and lowering said vertically movable end thereof; and control means carried by said passageway adjacent said vertically movable end thereof for operating said reversible motor means in directions to raise and lower said vertically movable end of said passageway in response to upward and downward movement of the portion of a vehicle engaged by said vertically movable end of said passageway, said control means including a vertical movement detector frictionally engageable with the vehicle and mounted on said passageway for vertical movement relative thereto, said control means also including actuating means for said reversible motor means engageable by said detector, said detector including telescopically connected base and vehicle engaging elements, said base element being movably mounted on said passageway and engageable with said actuating means, and said detector including resilient means connected to said base and vehicle engaging elements for biasing said vehicle engaging element into frictional engagement with the vehicle.

5. In a vehicular loading and unloading structure, the combination: a passageway having a vertically movable, vehicle engaging end; reversible motor means connected to said passageway for raising and lowering said vertically movable end thereof; and control means carried by said passageway adjacent said vertically movable end thereof for operating said reversible motor means in directions to raise and lower said vertically movable end of said passageway in response to upward and downward movement of the portion of a vehicle engaged by said vertically movable end of said passageway, said control means including a vertical movement detector frictionally engageable with the vehicle and mounted on said passageway for movement relative thereto, said control means also including actuating means for said reversible motor means engageable by said detector, said detector including telescopically connected base and vehicle engaging elements, said base element being pivotally mounted on said passageway and engageable with said actuating means, and said detector including resilient means connected to said base and vehicle engaging elements for biasing said vehicle engaging element into frictional engagement with the vehicle.

6. In a vehicular loading and unloading structure, the combination of: a passageway having a vertically movable, vehicle engaging end; reversible motor means connected to said passageway for raising and lowering said vertically movable end thereof; control means carried by said passageway adjacent said vertically movable end thereof for operating said reversible motor means in directions to raise and lower said vertically movable end of said passageway in response to upward and downward movement of the portion of a vehicle engaged by said vertically movable end of said passageway, said control means including a vertical movement detector frictionally engageable with the vehicle and mounted on said passageway for vertical movement relative thereto, said control means also including actuating means for said reversible motor means engageable by said detector, said detector including telescopically connected base and vehicle engaging elements, said base element being pivotally mounted on said passageway and engageable with said actuating means, and said detector including resilient means connected to said base and vehicle engaging elements for biasing said vehicle engaging element into frictional engagement with the vehicle; and means connected to said vehicle engaging element for moving same to a retracted position in opposition to the action of said resilient means.

References Cited in the file of this patent

UNITED STATES PATENTS

| | | |
|---|---|---|
| 1,305,594 | Furlow | June 3, 1919 |
| 2,489,869 | Dunn | Nov. 29, 1949 |
| 2,688,761 | Good | Sept. 14, 1954 |
| 2,846,703 | Adley | Aug. 12, 1958 |
| 2,868,909 | Guntert et al. | Jan. 13, 1959 |
| 2,875,457 | Read | Mar. 3, 1959 |